Aug. 7, 1951  N. C. BEESE  2,562,887
VAPOR LAMP AND SYSTEM
Filed Jan. 4, 1945  4 Sheets-Sheet 1
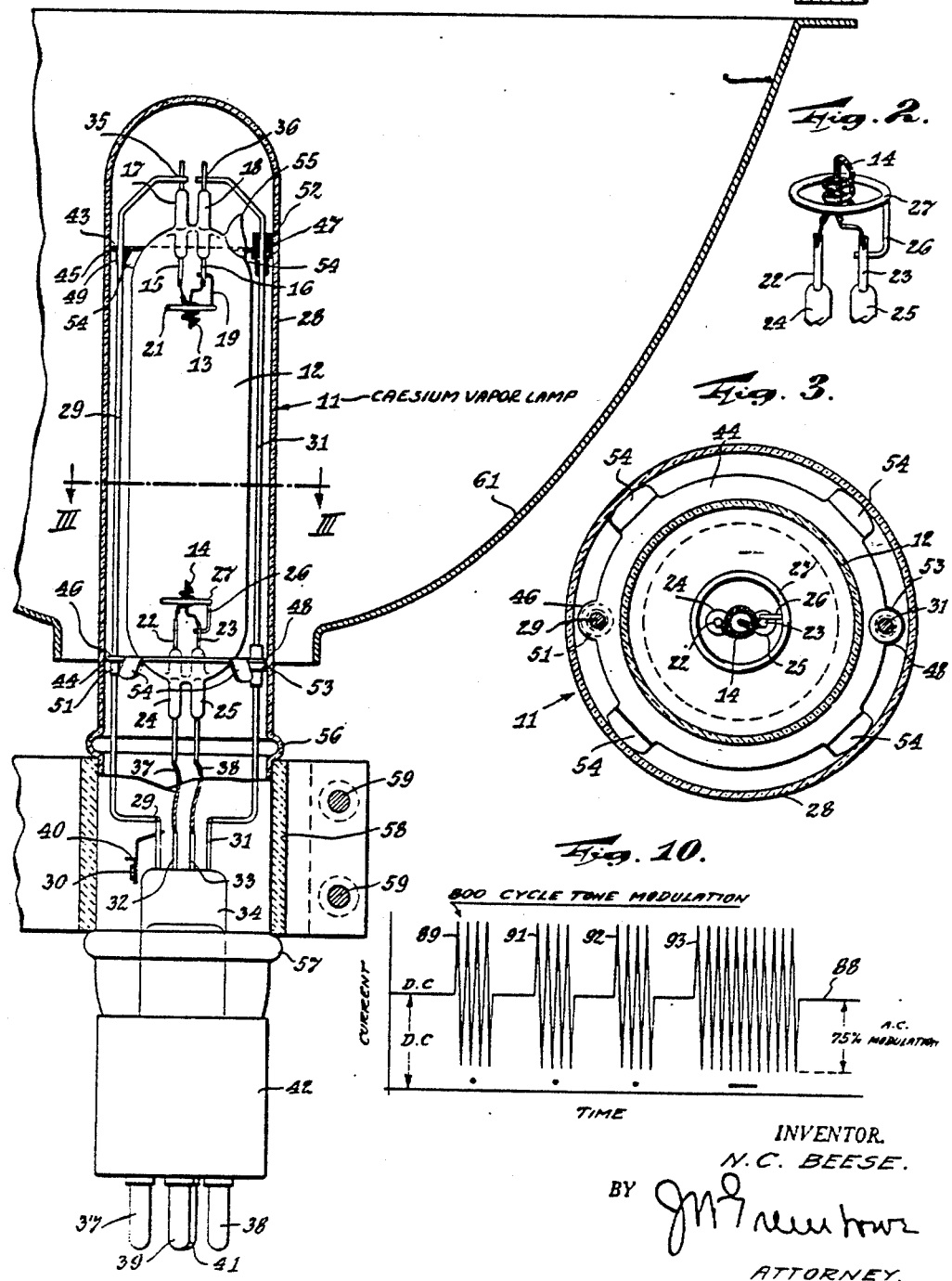
INVENTOR.
N. C. BEESE.
BY
ATTORNEY.

Aug. 7, 1951  N. C. BEESE  2,562,887
VAPOR LAMP AND SYSTEM
Filed Jan. 4, 1945  4 Sheets-Sheet 2
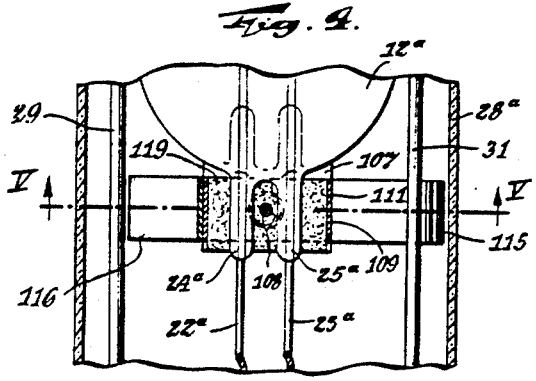
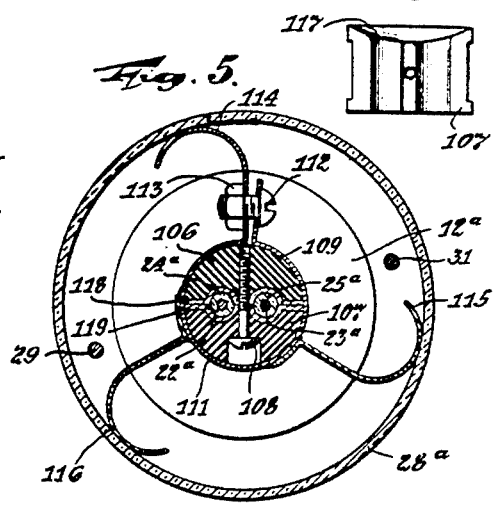
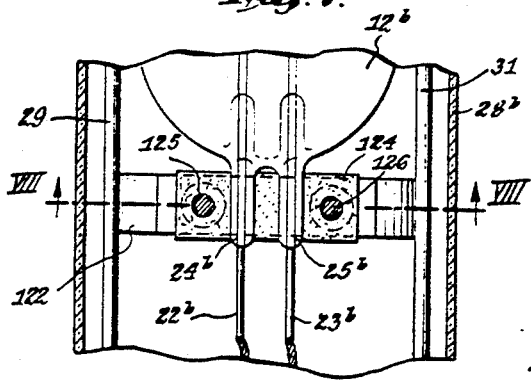
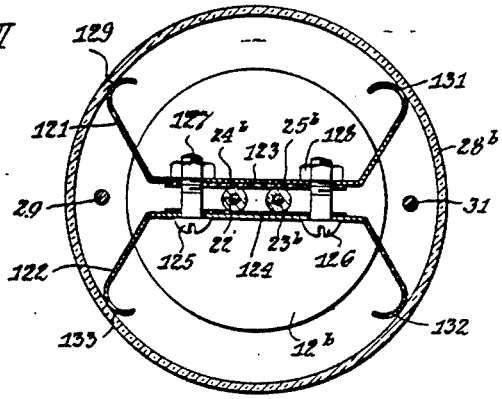
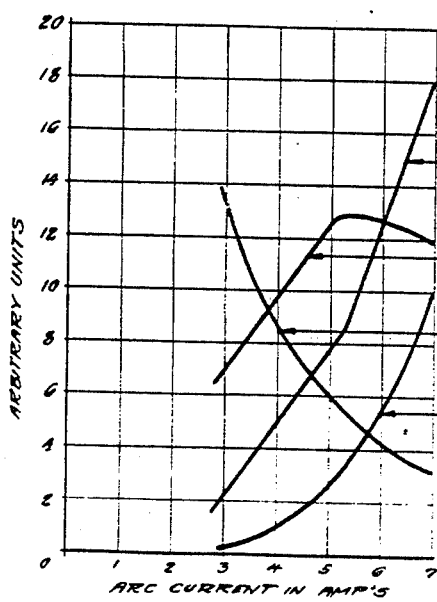
INVENTOR.
N. C. BEESE.
BY
ATTORNEY.

Aug. 7, 1951 N. C. BEESE 2,562,887
VAPOR LAMP AND SYSTEM
Filed Jan. 4, 1945 4 Sheets-Sheet 3

INVENTOR.
N. C. BEESE.
BY
ATTORNEY

Aug. 7, 1951  N. C. BEESE  2,562,887
VAPOR LAMP AND SYSTEM
Filed Jan. 4, 1945  4 Sheets-Sheet 4
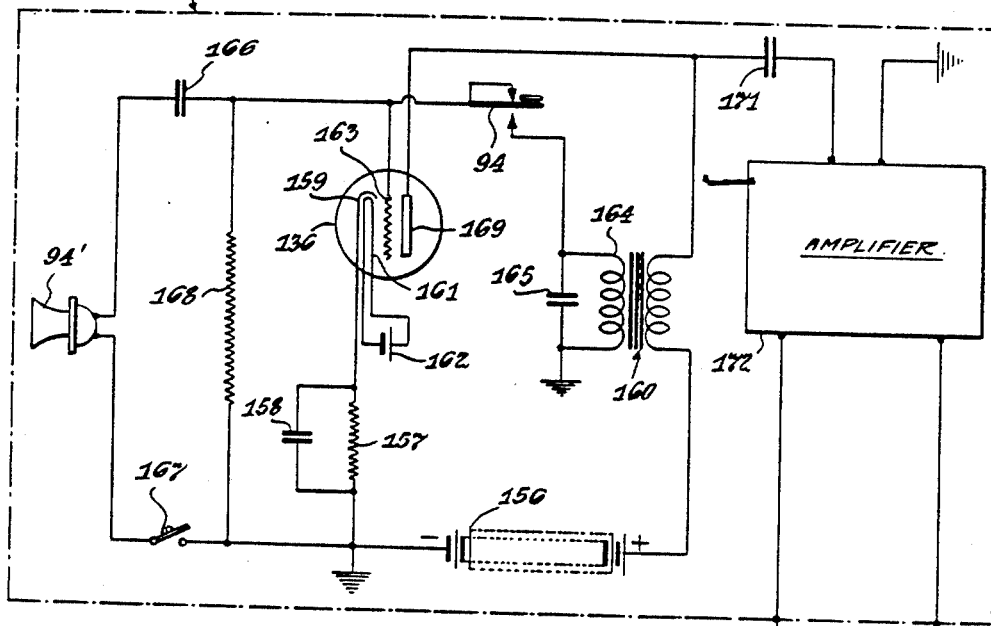
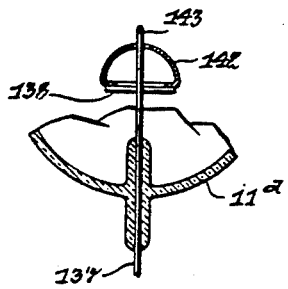
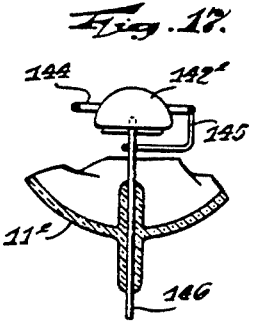
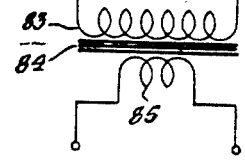
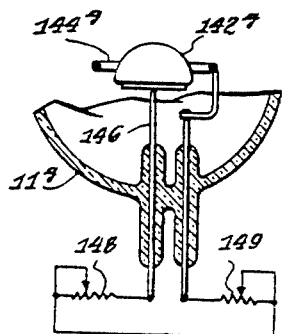
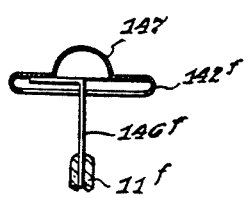
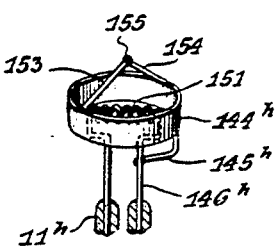
INVENTOR.
N. C. BEESE
BY
ATTORNEY.

Patented Aug. 7, 1951

2,562,887

UNITED STATES PATENT OFFICE 2,562,887

VAPOR LAMP AND SYSTEM

Norman C. Beese, Verona, N. J., assignor to Westinghouse Electric Corporation, East Pittsburgh, Pa., a corporation of Pennsylvania Application January 4, 1945, Serial No. 571,270

20 Claims. (Cl. 250—7)

This invention relates to vapor lamps and more particularly to such adapted to be modulated for signal purposes.

The principal object of my invention, generally considered, is a vapor lamp which efficiently generates invisible radiations adapted to be modulated to a large extent for the transmission of speech or signals.

Another object of my invention is a caesium vapor lamp which is adapted to generate a large output of infra-red radiations at high efficiency and with a relatively high intrinsic brilliance, from a device of small size, whereby it is usable for communications in a parabolic mirror of moderate size.

A further object of my invention is to provide a discharge device in which the arc produced is capable of modulation to a large extent throughout the audio range of 200 to 5000 cycles.

A still further object of my invention is a relatively small size caesium vapor lamp containing argon at a pressure between 5 and 30 centimeters, said lamp being between 1 and 1½ inches in diameter, between 4 and 6 inches long, containing .2 to .5 gram of caesium,, and operable on between 50 and 125 watts.

An additional object of my invention is to provide a communications system involving in combination, a vapor lamp, means operating it to generate radiations, means modulating the operating current to cause a corresponding variation of said radiations, and a photoelectric receiver of said modulated radiations.

Other objects and advantages of the invention, relating to the particular arrangement and construction of the various parts, will become apparent as the description proceeds.

In the drawing:

Fig. 1 is an axial sectional view, partly in elevation, of a lamp embodying my invention, associated with a parabolic reflector and a filter, to scale, approximately three-quarters size in the drawing filed with the application.

Fig. 2 is a perspective view on an enlarged scale, showing one of the electrodes.

Fig. 3 is a transverse sectional view of the line III—III of Fig. 1, in the direction of the arrows, but to the scale of Fig. 2.

Fig. 4 is a fragmentary longitudinal sectional view, with parts in elevation, illustrating a modified form of lamp embodying my invention.

Fig. 5 is a transverse sectional view on the line V—V of Fig. 4, in the direction of the arrows.

Fig. 6 is a detailed elevational view of one of the insulating inserts shown in Figs. 4 and 5.

Fig. 7 is a view corresponding to Fig. 4, but showing a further embodiment of my invention.

Fig. 8 is a transverse sectional view on the line VIII—VIII of Fig. 7, in the direction of the arrows.

Fig. 9 is a chart showing various characteristics of my lamp in the form of curves.

Fig. 10 is a diagram representing one way in which the current to the lamp may be modulated.

Fig. 15 is a wiring diagram illustrating how the modulating key and microphone are connected in the modulator circuit.

Figure 11:
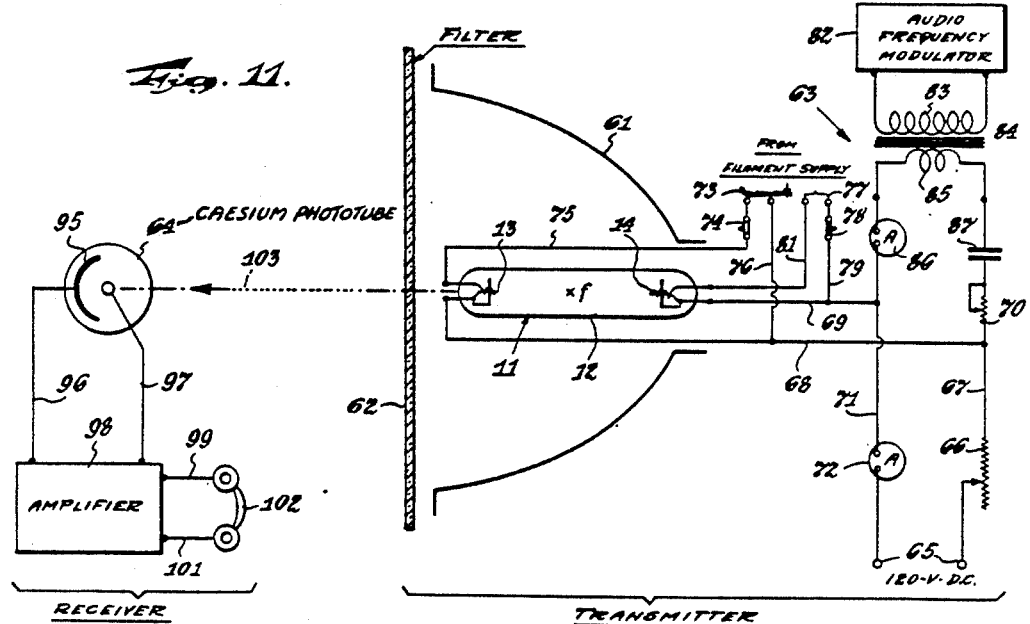
Fig. 11 is a diagram showing how a lamp embodying my invention may be employed for generating radiations which are receivable at some distant point by a photoelectric cell and associated apparatus.

Figs. 16 to 20, inclusive, are detailed elevational views, with parts in section, illustrating modified forms of electrodes which may be used in high-powered lamps embodying my invention.

The present invention is the result of a development to produce a discharge lamp adapted for secret communications. I have found that a discharge lamp with a caesium vapor arc is particularly suitable as a source of near infra-red radiation. The resonance lines produced by caesium lie at 8521 A. U. and 8944 A. U., that is, just beyond the visible range, and energy thereat is generated at high efficiency with low vapor pressure of caesium, in a lamp otherwise somewhat similar to that of a sodium vapor lamp. If the lamp characteristics were similar to mercury or sodium for the generation of resonance radiations, the intrinsic brilliance would be very low and large size lamps would be required for a moderate power, say, 100 watts. One of the principal goals was to develop a source of small size and relatively high intrinsic brilliance, yet with a total output relatively high, that is. about 100 watts, so that the lamp could be used in a moderate size parabolic mirror for communications. Besides the requirements just stated, the arc must be capable of modulation throughout the audio range of 200 to 5000 cycles per second. Tests on my lamp show that it fulfills these requirements.

Referring to the drawing in detail, like parts being designated by like reference characters and first considering the lamp itself, illustrated in Figs. 1, 2 and 3, there is shown a caesium vapor lamp 11 comprising an inner generally cylindrical envelope 12 of vitreous material, such as glass, containing an inert gaseous filling and a small quantity of metallic caesium. Inert gas pressures ranging from about 5 to about 30 centimeters of mercury were tried in my lamp. It was found that the optimum pressure of argon gas was near 20 centimeters of mercury, at least in the range of envelope diameters between 1 and 3 inches. While argon gas is ordinarily employed on account of its low cost and availability, the heavier rare gases, krypton and xenon, serve to increase the efficiency of such devices to some extent. Mixtures of neon and argon have also been found to be satisfactory. Caesium was distilled into the lamp before it was sealed off. There is preferably a visible excess of liquid caesium while the lamp is in normal operation. For lamps 1 inch to 1½ inch in diameter and 4 to 6 inches long, the caesium should be about 0.2 gram. Such a lamp operates satisfactorily with a power consumption between 50 and 125 watts. Larger lamps, for example 3 inches in diameter and 10 to 12 inches long, consuming 200 to 500 watts, require about 0.5 gram caesium.

In each end of the lamp is mounted an oxide-coated filamentary electrode, designated 13 and 14, respectively. The electrode 13 is shown supported on leads 15 and 16 extending through end seal portions 17 and 18 at one end of the lamp. One of the leads, say 16 to the straight or central portion of the electrode, has an extension 19 supporting a ring-shaped or toroidal electrode which serves to stabilize the arc and receive some of the discharge.

The electrode 14, shown in greater detail in Figs. 2 and 3, is similarly constructed, that is, it has supporting leads 22 and 23 passing through end seal portions 24 and 25 of the envelope, one of said leads, say 23 to the straight or central portion of the electrode, having an extension 26 supporting a ring-shaped or toroidal electrode 27, like the electrode 21 and for a similar purpose.

The rings or toroidal electrodes 21 and 27 absorb part of the energy of the discharge, protect the filamentary electrodes, and increase the current-carrying capacity of the device. They also distribute the arc over a sizable area, instead of permitting it to concentrate on a relatively small spot on the filamentary electrode. A ring of molybdenum wire .05 inch in thickness and ½ to ¾ inch in diameter surrounding the active electrode, when the latter is about ¼ inch in diameter, and placed in or near the medium plane perpendicular to the axis of said filamentary electrode, is suitable. Such a ring if over 1 inch in diameter, however, does not produce as good a result.

Experiments have been performed with such a lamp, 2 inches in diameter and 8.75 inches between electrode tips, when mounted inside a Dewar flask in a vertical position. Measurements were made of the arc voltage and infra-red radiation. Electrodes at each end of the lamp were made as illustrated, but the ring electrodes were given separate lead wires so that they could be connected at will to either of the filamentary leads or left at floating potential. The rings in this instance were made of .05 inch molybdenum wire, with an outside diameter of ½ inch. The lamp was filled with argon gas at a pressure of about 20 centimeters of mercury and contained a small amount of metallic caesium. It was operated on direct current with the anode at the bottom.

It was found that the toroidal electrode had practically no effect on the cathode; i. e. connected to either leg of the filament or at floating potential the lamp characteristics remained practically constant. The toroidal electrode had a pronounced effect on lamp characteristics when used as part of the anode. When the positive side of the supply was connected to the lead 23, with the toroidal electrode 27 connected as illustrated in Fig. 1, the infra-red output was about 10% greater than when connected only to that portion of the filament 14, with the toroidal electrode 27 "floating" or disconnected. The lamp voltage was approximately the same in each case and the arc was centrally located in the bulb. However, when connection was made with the lead 22, with the toroidal electrode 27 "floating," the lamp voltage increased several volts and resulted in a lower infra-red output, that is, lower than when the connection was made to lead 23, with the toroidal electrode 27 connected thereto as illustrated in Fig. 1. At the same time, the arc was displaced to the side of the lamp.

On the other hand, if the connection is made to the lead 22, when lead 26 was connected thereto, rather than the lead 23, the voltage and output increased, as compared to the connection to the lead 23 with the toroidal electrode connected as illustrated in Fig. 1, but the arc was displaced to the side of the bulb. With the supply connected only to the toroidal electrode 27, that is, when disconnected from the filament, the lamp voltage and output was high but the arc was displaced to the side of the bulb. Such arc displacement is objectionable because it overheats the bulb locally and causes more rapid chemical activity of the caesium with the bulb and its coating.

For small size lamps operating at about 5 amperes current, it is found desirable to use the filamentary electrodes alone. For somewhat heavier current the same electrodes are desirably used with the addition of the ring electrodes, which latter should be interiorly connected to the leads which pass directly to the central or axial portions of the filaments, as illustrated in Fig. 1, and the external connection made to said leads. From measurements of such a lamp, it is found that about 55% of the current is carried by the rings, involving an extension of the life of the filamentary electrodes. For still larger lamps, such as those operating at 400 watts and over, the electrode structure should be more massive, and for direct current the anode structure may be different from that of the cathode.

Each electrode 13 and 14, is desirably formed as a coil of fine tungsten wire overwound upon a coil of tungsten filament, and coated with alkaline earth oxide to make it efficiently emit electrons when heated.

A caesium vapor lamp like a sodium vapor lamp must operate at a temperature well above ambient in order to obtain a sufficient vapor pressure of caesium. In order to conserve heat and make the lamp operate efficiently, it is mounted inside of an evacuated outer housing or inside of a double wall vacuum flask, known as a Dewar flask.

A lamp such as illustrated in Fig. 1 is suitable for operation up to 125 watts. Lamps having dimensions of 2 to 2½ inch bulb diameter and about 10 inches in length are suitable for operation on from 200 to 250 watts. A lamp 3 inches in diameter and about 12 inches long is suitable for operation at 400 to 450 watts.

In the present embodiment, the inner envelope 12 with its associated parts is held inside an outer generally cylindrical envelope 28, of vitreous material, such as glass, as by means of supporting leads 29, 31, 32 and 33 passing through a press 34 thereof. The leads 29 and 31 are extended between the inner and outer envelopes and connect respectively with the leads 15 and 16, as indicated at 35 and 36. The leads 32 and 33, in turn, connect respectively with the leads 22 and 23, as by means of flexible conductors 37 and 38. The leads 29, 31, 32 and 33 extend out of the outer envelope 28 and respectively connect with the outer contact members 37, 38, 39 and 41 projecting from the base 42.

The inner envelope 12 is held in place in the outer envelope 28, as by means of metal rings 43 and 44, respectively having lugs 45 and 46 apertured for the reception of the lead extension 29, and lugs 47 and 48 apertured for the reception of the lead extension 31. The rings 43 and 44 are held on the lead extension 29, as by metallic collars 49 and 51 secured thereto in any convenient manner, while the rings 43 and 44 are held on the lead extension 31, which passes in spaced relation therethrough, as by insulating collars 52 and 53 held on said extension in any convenient manner.

Each ring 43 and 44 is of such an internal diameter that it seats the corresponding generally spherical end of the inner envelope 12 and has a plurality of peripheral tabs 54 which extend diagonally and frictionally engage the inner surface of the outer envelope 29, to thereby hold the inner envelope in fixed position with respect thereto. After the inner envelope has been mounted on the supporting leads, extending from the press portion 34 of the outer envelope it, after sealing as indicated at 55, is inserted in the outer envelope 28 and the latter evacuated and sealed. A barium-iron getter wire 30, supported on a suitable shield 40, mounted on a lead, such as 29, is desirably activated, as by means of high frequency after the outer evacuated envelope 28 is sealed, in order to maintain a high vacuum therein throughout the life of the lamp.

The whole assembly may be supported by having the outer envelope formed with a pair of ridges 56 and 57, between which a clamp 58 grips said outer envelope 28 and is suitably secured to a support as by means of bolts 59.

The best material to use for the envelope of my lamp is Corning No. 705AJ glass, sold as Code No. 705, the properties of which are later disclosed, which is quite resistant to attack by alkali vapors. To further improve the chemical stability of the lamp envelope, it is desirably interiorly coated with a glaze composed largely of boric acid, similar to the way in which sodium lamps are protected. This treatment makes the device a practical lamp with long life expectancy. The above statement with regard to known glasses is made without prejudice to the possibility of a better glass being developed.

Satisfactory lamps have been made with an arc length equal to and greater than a bulb diameter, the upper limit being about five times the bulb diameter. Lamps with longer arc lengths, for example, a 12 inch arc length in a lamp having an envelope 1½ inches in diameter, require abnormally high voltages for starting the lamp. However, lamps have been made of ½ inch diameter tubing 3 feet long and wound into a close spiral about 2 inches in diameter. Such lamps require a high voltage transformer, like that used for neon signs, to operate them and take less than 1 ampere of current.

All caesium vapor lamps are difficult to start, so provision must be made to have either the line voltage greatly in excess of the normal operating voltage, or some auxiliary external device must be used for starting. Lamps such as have been described, except tubular spiral lamps, have an operating voltage of from about 10 volts to about 30 volts, but the starting voltage generally exceeds 100 volts. This is because of the high pressure of inert gas filling the lamp, and the deposit of metallic caesium on the bulb wall which acts like a grid in obstructing the initiation of a discharge.

It is preferable in starting such lamps to preheat the electrodes at each end for several minutes, to a temperature of about 900° C., before applying the starting voltage. This produces a cloud of electrons at each electrode, and also heat to redistribute the caesium film in the vicinity of the electrodes, and thus reduce the grid effect.

It will be seen that, by virtue of having four leads to the lamp, the filamentary electrodes 13 and 14 may be independently energized as well as a desired voltage impressed therebetween. After preheating the electrodes, as before metioned, for from one to three minutes, the necessary high voltage is applied to produce the discharge. I preferably use a transformer with a potential of about 600 volts in the secondary winding on open circuit, and with a current rating of about 1 ampere on short circuit, starting the arc with this transformer and then applying the operation direct or alternating current at, say, 120 volts supply. As soon as the direct or alternating current arc has started, the high voltage supply is disconnected, as by using the strong arc current of from 5 to 8 amperes to operate a relay for that purpose, and the two filaments may be disconnected from the heating source. Such a method of starting is preferable to using transformers having current capacities of from 25 to 100 milliamperes with voltages of from about 2,000 to 3,000 on open circuit.

In some lamps, a noticeable improvement, from 20% to 40%, is obtained during lamp operation by keeping the filaments burning, preferably at a somewhat lower current than that used in the original heating. This additional wattage at the ends of the lamp helps to produce an isothermal bulb surface and hence tends to produce maximum efficiency. Covering the ends of the lamp with platinum or gold paint, certain ceramic materials, or bright sheet metal shells will conserve the heat and improve the lamp efficiency. Actual tests with platinum paint at the ends of the lamp increased the efficiency about 15%.

Figure 13:
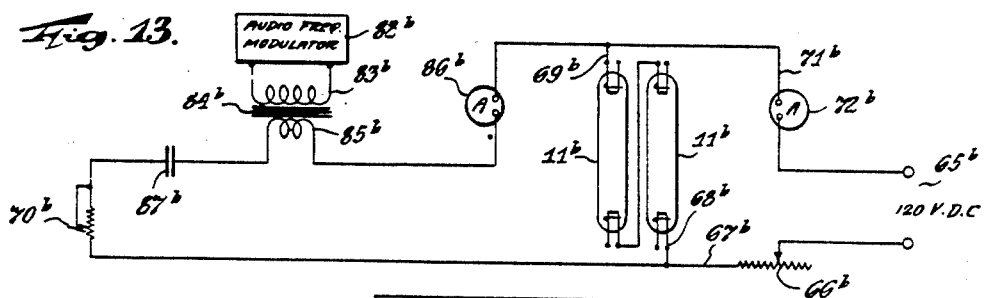
Figs. 13 and 14 are diagrams corresponding to Fig. 12, but showing, respectively, the employment of two of my lamps in series, and the employment of two of them in parallel.
Figure 14:
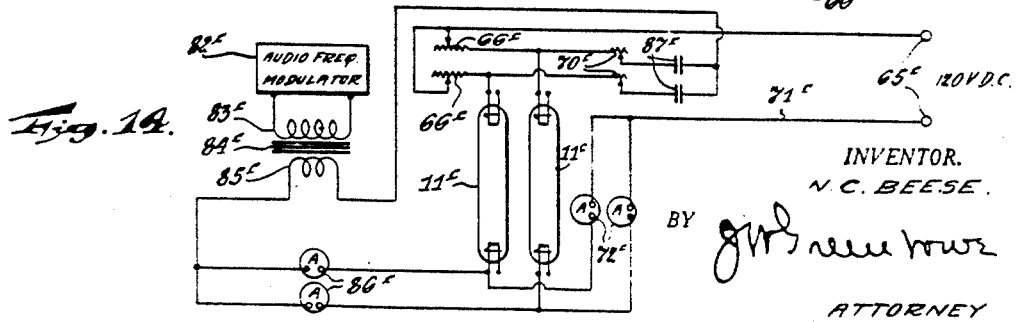

When used for communications along a single line of sight, a parabolic reflector 61 is desirably mounted with respect to such a lamp so that its focus lies on the center of the inner envelope 12, or with respect to a plurality thereof closely spaced and connected as illustrated in Fig. 13 or Fig. 14, for example, thereby projecting the generated radiations in an approximate line from the source along the axis of the envelope 12, as the greatest intensity of the discharge lies at the center of said envelope.

Referring now to the embodiment of my invention illustrated in Figs. 4, 5 and 6, there is shown a construction alternative to that of Figs. 1 and 3, and which, along with that of Figs. 7 and 8, is described only insofar as it differs from that of the first embodiment, for supporting and spacing the inner envelope 12ª with respect to the outer envelope 28ª. That is, instead of using the rings 43 and 44, one at each end of the inner envelope, I employ a construction such as here illustrated at each end of the inner envelope, said construction involving a pair of insulating members 106 and 107 which fit together and around the projecting end portions 24ª and 25ª on the envelope 12ª, and are clamped securely in place, as by means of a screw 108.

Around these assembled insulators 106 and 107 is applied a spring-metal clamp 109 consisting of a central generally-circular portion 111, which is tightened about the members 106 and 107 as by means of a bolt 112 and nut 113. From the portoin 111 project curved spring fingers 114, 115 and 116 into engagement with the inner surface of the outer envelope 28ª, to thereby properly position the inner envelope 12ª, like the envelope 12 is positioned in the first embodiment, giving greater leeway on account of the additional resiliency provided by the longer spring members, as compared with the tabs 54. The surfaces of the members 106 and 107 which engage the ends of the envelope 12ª are desirably curved to correspond as indicated at 117. Likewise the adjacent faces of these members are desirably provided with mica, glass tape, or asbestos tape, 118 and 119, to act as a cushion about the extensions 24ª and 25ª which form beading on the leads 22ª and 23ª. The construction at the other end of the envelope 12ª, corresponds with that illustrated.

Referring now to the embodiment of my invention illustrated in Figs. 7 and 8, there is shown a construction similar to that of Figs. 4 and 5 for spacing the inner envelope 12ᵇ with respect to the outer envelope 28ᵇ of a lamp embodying my invention. In this case, I provide two springs 121 and 122, the intermediate portions of which are clamped over the inner bulb extensions 24ᵇ and 25ᵇ, which act as beading on the leads 22ᵇ and 23ᵇ, desirably employing some cushioning insulation such as 123 and 124 between the faces of said springs which directly engage said extensions, like the cushioning means 118 and 119. These springs are then desirably clamped in place, as illustrated, by means of bolts 125 and 126 with cooperating nuts 127 and 128. The outer ends of these springs 121 and 122 are curved, as indicated at 129, 131, 132 and 133, to provide resilient fingers engaging the inner surface of the outer envelope 28ᵇ to properly space the inner envelope with respect thereto. Although the construction at only one end of the envelope 12ᵇ is shown, it will be understood that a similar construction is employed at the other end of said envelope.

Fig. 9 illustrates some of the characteristics of a lamp embodying my invention, when mounted inside of a double wall Dewar flask with two chromel-alumel thermocouple junctions made of .005 inch wires attached to the lamp, one at the lower end to indicate vapor pressure of the caesium, and the other at the center of the bulb to indicate maximum temperatures. The couple at the center of the bulb always reads about 25° to 30° C., higher than the one at the lower end. The lamp so tested was 1.3 inches in diameter and had electrodes spaced 3.05 inches apart. The lamp was operated under stable conditions on direct current. Thermal equilibrium was obtained by one hour operation before measurements were made, and 20 minutes was allowed between successive readings. Thermocouple voltages were taken with a potentiometer and compensated for room temperature in the instrument.

The lamp was operated at various arc currents in the range between 3 to 7 amperes. Measurements were made with a caesium photocell, RCA No. 919, and a Wratten #87 filter, to determine relative values of near infra-red radiation. Visible light was measured with a Weston light meter.

A consideration of Fig. 9 will show the graphs which resulted from the data taken during the aforementioned tests. All recorded values are relative, expressed in arbitrary units, except for the caesium vapor pressure curve which was obtained by converting the temperature recorded at the lower end of the lamp into vapor pressure expressed in millimeters of mercury. The optimum or recommended rating for the lamp is thus between 5 and 5½ amperes, giving a caesium vapor pressure between about 2½ and 3½ mm., which corresponds with an operating temperatur above 300° C.; that is, between about 307° and 325° C. At the higher of these points the maximum response was obtained with a caesium photocell, and between said points the visible light begins to increase at a more rapid rate, said increase being at the expense of the resonance radiations of the caesium vapor. Similar lamps have been burned at this recommended rating for over 100 hours, with a near infra-red output of between .5 to .8 of the initial values.

A closer consideration of the curves of Fig. 9 will show that as the arc current increases the near infra-red output increases rapidly to about 5 amperes, when it increases at a slower rate to a maximum at about 5.5 amperes, and then starts to decrease. All this time the caesium vapor pressure is increasing, while the visible light increases at about the same rate as the near infra-red to an operating current of between 5 and 5½ amperes, after which the rate abruptly increases. During this increase in arc current the relative efficency of infra-red production decreases.

Such a lamp as just described can readily be converted to a secret signaling or communications device with a suitable infra-red filter, designated 62, and auxiliary operating equipment, generally designated 63 and illustrated in Fig. 11. For night-time secret communication work with the caesium vapor lamp as the source, it is necessary that an optically-dense filter 62 be employed, but the preferably caesium phototube receiver 64, illustrated in Fig. 11, need not be covered. The filter can be so arranged that it may be placed over the photocell for day-time communications. For such service, there is no necessity for covering the lamp with a filter, but such is highly desirable over the photocell to reduce fluctuations of daylight intensity to a minimum.

For night-time service, where secrecy is not necessary, it is desirable to employ no filter, and thereby improve signal reception by a factor of more than three depending on the type of filter used. Common filters are Wratten No. 87, which is a gelatin-base filter, will not stand high temperatures, and hence does not seem practical at present, although its transmission for near infra-red and absorption for visible light are excellent; polaroid cellophane filters which are more weather and temperature resistant, but transmit only about 25% to 45% of the caesium resonance radiations; and Corning glass filters which are chemically and physically stable but have very low transmissions.

An excellent combination of source 11 and receiver 64 is my caesium lamp, in which the total radiated energy is large in the resonance lines of caesium, and a caesium-type photocell having a maximum response in this same region. Measurements with a thermopile and suitable filters indicate that approximately 25% of the energy supplied to such caesium lamps is radiated in the two resonant spectral lines 8521 A. U. and 8944 A. U. Except for a small amount of visible light, practically all the rest is radiated as long wave infra-red and cannot be utilized. Other receivers may be used in conjunction with caesium lamps, such as thallofide cells, but this type of detector is photoconducting, responds to a broader wave length infra-red band than the caesium photocell, and hence may pick up more extraneous noise from variations in daylight intensity than the more selective caesium phototube.

In accordance with Fig. 11, the lamp 11 is shown energized from a source 65 of direct current, of 120 volt potential, for example, through control rheostat 66, lines 67 and 68, electrode 13, the discharge in the envelope 12, electrode 14, line 69, line 71, ammeter 72 and back to the source 65. The filamentary electrode 13 is energized from filament supply 73, through switch 74, line 75 and back to the source through lines 68 and 76. The filamentary electrode 14 is likewise energized from supply 77, through switch 78, lines 79 and 69, and back to the source through line 81.

The modulating power is applied to the discharge from audio frequency modulator 82 to primary winding 83 of transformer 84, one terminal of the secondary winding 85 of which is connected in parallel with the direct current through ammeter 86 and line 69 to electrode 14, while the other terminal is connected through blocking condenser 87 of preferably about 250 microfarads capacity, rheostat 70, and line 68 to the other electrode 13. Fig. 15 illustrates one embodiment of my modulator, showing the manner in which the modulating key 94 and microphone 94' may be connected in the circuit of the audio frequency modulator 82. The modulators 82ª, 82ᵇ and 82ᶜ may correspond with the modulator 82. In said figure, the reference character 136 designates the first electronic tube of the audio frequency modulator unit. This is powered in any suitable manner as from a battery 156 connected, through a resistor 157 and condenser 158 in parallel, to the cathode 159 of said tube, heated by filament 161 energized from source of power, such as battery 162. The key 94 is in the feed-back circuit to the grid 163, which circuit includes an inductive coupling 160 from the plate circuit to resonant circuit, comprising reactor 164 and condenser 165, for generating audio frequency oscillations of the desired frequency, say 800 cycles per second.

The microphone 94', for modulating the circuit independently of the key 94, is desirably connected, through a condenser 166 and switch 167, in parallel with a high resistance 168, to the cathode terminal of the tube 136 beyond the resistor 157 and to the grid 163. The plate 169 of said tube is connected, through condenser 171, to the amplifier 172, which is in turn connected to the primary winding 83 of the transformer 84, the secondary winding 85 of which is connected in parallel with the direct current supply, as previously described in connection with Fig. 11.

The diagram in Fig. 10 represents one form of modulation of the direct current 88 supplied to the lamp 11 from the source 65, the high frequency portions 89, 91, 92 and 93 representing intervals during which current from the modulator is superimposed upon the direct current 88, as by depresing or closing a key 94 in the line. The modulation in the present instance represents dot-dash signaling, the short modulated portions 89, 91 and 92 representing dots, and the long modulated portion 93 representing a dash. This is only one of the means of modulation, as the key 94 may be replaced by a voice-modulated microphone, so that the correspondingly-modulated radiations emitted by the lamp 11, and directed by the reflector 61 through the filter 62, are receivable on the cathode 95 of the photoelectric device 64, and passed from said device through lines 96 and 97 to amplifier 98, in turn connected through lines 99 and 101 to some receiving device such as earphones 102.

It will therefore be seen that the message transmitted by the key in dot-dash form is received by the earphones 102 as short buzzes representing dots, and long buzzes representing dashes, or if the key 94 is replaced by a voice-modulated microphone, the corresponding speech is directly heard in the phones 102. The distance between the lamp 11 and the phototube 64, represented by a dotted arrow 103, may be as far as can be seen, assuming a strong enough lamp 11 and/or a sufficiently strong detecting and amplifying arrangement, as the infra-red radiations travel like visible light, except that they are more penetrating, in so far as water vapor, as in the form of fog, is concerned. These radiations, however, are absorbed to a great extent by smoke, just like visible light.

Figure 12:
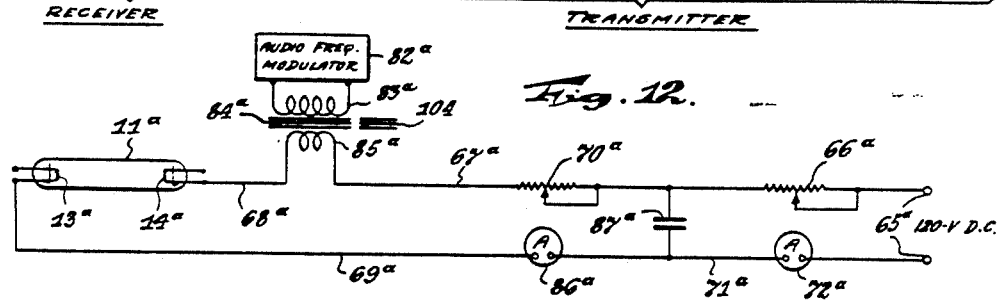
Fig. 12 is another diagram showing how my lamp may be used for a similar purpose.

Referring now to the embodiment of my invention illustrated in Fig. 12, there is shown an arrangement similar to Fig. 11, except that the modulating current is applied in series rather than in parallel with the direct current. The arrangement is similar in result to that of the preceding embodiment. A lamp 11ª like the lamp 11, is supplied with power from a source of direct current 65ª, through rheostats 66ª and 70ª, and lines 67ª and 68ª to electrode 14ª, through the discharge to the other electrode 13ª, and back to the source 65ª through the lines 69ª, 71ª and direct current ammeter 72ª.

In the present system, the audio frequency modulator 82ª is connected to the primary winding 83ª of output transformer 84ª (with a matched impedance and air gap core 104), the secondary 85ª of said transformer being connected between lines 67ª and 68ª so that the modulations applied to the lamp 11ª are in series with the direct current applied from the source 65ª. The provision of the air gap core 104 is to avoid core saturation by the direct current which passes through the secondary winding 85ª. In this instance, the blocking condenser 87ª, which may be about 250 microfarads as in the preceding embodiment, is connected between the lines 67ª and 71ª, as illustrated. The ammeter 86ª, in the present embodiment, measures not only the audio frequency current but the direct current on which it is superimposed, so that the reading is the resultant of two currents. Except as specifically disclosed in the present embodiment, the same may correspond with the preceding embodiment, it being understood the numerals with letter suffixes mean that the device represented corresponds with the device of the same numeral in the first or preceding embodiment.

Referring now to the embodiment of my invention illustrated in Fig. 13, there is shown an arrangement identical with that of Fig. 11 except that two lamps 11$^b$ are used in series, rather than only one lamp. In other words, the current from the direct current source 65$^b$ passes through rheostat 66$^b$ and lines 67$^b$ and 68$^b$, through lamps 11$^b$ in series, and back to the source through lines 69$^b$ and 71$^b$, and ammeter 72$^b$. The modulating current is applied, in parallel as in Fig. 11, from audio frequency modulator 82$^b$, to primary winding 83$^b$ of its transformer 84$^b$, the secondary winding 85$^b$ of which supplies the modulating current to the series-arranged lamps 11$^b$, through blocking condenser 87$^b$ which, in this instance, may be one of from 200 to 500 microfarads, rheostat 70$^b$, and ammeter 86$^b$.

A simple way to start two such lamps 11$^b$ for series operation is to place a large inductance in the direct current line from the source 65$^b$, so as to use its inductive kick to facilitate starting. The lamp filaments should be preheated for from one to three minutes, the lamps short circuited, the short across one lamp opened and then a short time later the short circuit across the other lamp is removed. A choke coil of from one to three henrys is suitable. Such a coil will also tend to stabilize the current supplied from the direct current source.

The embodiment of Fig. 14 is identical with that of Fig. 13 except that the lamps 11$^c$ are arranged in parallel with one another rather than in series, the power thereto being supplied from source 65$^c$ through individual rheostats 66$^c$, through said lamps in parallel and back through individual ammeters 72$^c$ and line 71$^c$ to the source. The modulating current is, as in the preceding embodiment, supplied from audio frequency modulator 82$^c$, which may be identical with the modulator 82, to primary winding 83$^c$ of transformer 84$^c$, the secondary winding 85$^c$ of which is in a line in parallel with the power line from source 65$^c$, so that modulating current passes through individual condensers 87$^c$, desirably of about 250 microfarads capacity each, and through rheostats 70$^c$ in parallel, returning through individual ammeters 86$^c$.

Such caesium lamps are capable of high percentage current modulation, as compared to other lamps. This makes them ideal for communications work. They can be operated at or above 90% current modulation before the accompanying radiation modulation shows much distortion. This compares with a moderate size tungsten filament lamp which can be modulated to only about .01%, due to the heat capacity of the tungsten wire. A high pressure mercury lamp can be modulated satisfactorily to only about 15%. From tests made with my lamp on modulability, I have learned that it has excellent frequency response throughout the useful audio range. Under certain conditions, the "Modulation ratio" that is, the ratio of radiation modulation to current modulation, is above 90% for frequencies in the audio range from 100 cycles to 10,000 cycles per second.

One important difference between the resonance radiation of caesium vapor and that of the vapors of mercury and sodium, is that caesium vapor is more transparent to its own resonance radiations than the vapors of sodium and mercury are to their respective resonance radiations. If a sodium lamp is measured, as by a photocell, for light output in a certain direction, and then a second sodium lamp is placed directly behind the first lamp, it contributes nothing to the light reaching the photocell, due to absorption of its radiations by said first photocell. A similar experiment with two caesium lamps shows that the second lamp contributes about 25% as much radiation as the first, indicating considerable transparency and possibly accounting for ability to make a usable and practical search-light-type lamp out of a device that theoretically, by analogy with sodium and mercury, should have a very low intrinsic brightness.

The same conclusion was arrived at by measuring the near infra-red output from a caesium vapor lamp, both with and without a cylindrical metallic reflector so mounted behind the lamp that any radiation reflected by the mirror must pass through the lamp to reach the photocell measuring device. Inserting the mirror immediately increased the beam intensity, in the direction of the photocell, by 12½% in one experiment.

As previously mentioned, the simple electrode structure similar to that used in mercury lamps is satisfactory for use in caesium vapor lamps that operate on about five amperes of current. Larger lamps, or such that operate on about ten amperes of current, can use the same electrodes with the addition of a ring of molybdenum wire surrounding each filamentary electrode. For still larger currents, the cathode and anode structure should be made more massive, and for direct current operation may desirably be of different construction.

One of the chief difficulties in operating large size lamps at high wattage, that is, lamps three inches in diameter, 12 inches long, and operating at 400 watts or more, is to keep the arc relatively stable without constricting it or causing it to touch the side of the bulb. Factors such as spacing the electrodes from the ends of the lamp, ratio of length to bulb diameter, gas pressure, and wattage, affect the appearance of the discharge. In a symmetrical lamp, that is, one with the same electrode structure and relative spacing at each end, more stable operation is obtained when the lamp is burned in a vertical position with the anode on top, but the higher efficiency is obtained when the lamp is burned in such a position but with the anode at the bottom. It is desirable to anchor the arc stream to the middle of the envelope. Schemes for this purpose are illustrated in Figs. 16 to 19, inclusive, as follows:

Fig. 16 illustrates, in a caesium vapor lamp 11$^d$ embodying my invention, an anode formed as a metal cap 142, desirably hollow and generally hemispherical, opening toward the adjacent end of the envelope, and with a pointed or ball-topped wire "lightning arrester" 143, desirably as an extension of the supporting lead 137, which may have a cross support 138 to which the edge of said cap is connected, projecting through the center toward the cathode, not shown.

Fig. 17 illustrates a further embodiment of an anode 142$^e$, in a caesium vapor lamp 11$^e$ embodying my invention, said anode comprising a metal cap, similar to that of Fig. 16, and which protrudes toward the cathode, not shown, above or beyond the plane of a surrounding auxiliary toroidal anode or ring 144, held in place with respect to the cap electrode, as by means of a lead 145 branching from the main anode lead or support 146.

Fig. 18 illustrates for a caesium vapor lamp 11$^f$ an alternative form of anode 142$^f$, formed as a hollow metal disk supported from a lead 146$^f$ and with a central portion 147 bulging toward the cathode, not shown. The central bulge 147, may be replaced by a pointed or ball-topped wire projecting through a central hole in the anode, as in Fig. 16.

Fig. 19 illustrates a further alternative in a caesium vapor lamp 11$^g$, in which the anode 142$^g$, may be formed like the anode 14, 142 or 142$^e$ and has an auxiliary toroidal or ring shaped anode 144$^g$ with external adjustable resistors 148 and 149 to divide the current at will and thus cause electrostatic focusing. With the resistor 148 eliminated, or less in value than the resistance at 149, the ring electrode will acquire a negative bias and force more current to the central electrode. This is desirable in a caesium lamp.

Fig. 20 shows in a caesium vapor lamp 11$^h$ a further alternative, in which the anode may be in the form of an incandescible filament 151 surrounded by a short hollow metal cylinder 144$^h$, held in place with respect to the filament as by means of a lead 145$^h$ branching from one of the filament leads 146$^h$, opposite portions of the peripheral edge of said cylinder toward the cooperating electrode being united by a pair of wires 153 and 154, projecting diagonally toward the axis and cooperating electrode, and secured together at their point of meeting 155. Such a structure is suitable for a cathode as well as an anode.

As for installations of my communications system, the transmitter and receiver may be separate units rotated independently of each other and scanning the horizon continuously throughout the night, with multiple receiving units in one housing, and scanning the horizon at a different rate of rotation from the transmitter, whenever one wished to establish contact with some other observer. Assuming a transmitter in a 20° searchlight beam scanning the horizon with an 800 cycle key signal at the rate of one revolution in three minutes. Then every point on the horizon is illuminated for ten seconds.

If a continuously scanning receiver at a distant station is so adjusted to pick up at least part of this signal on each revolution of the transmitter, positive recognition can be established by a suitable relay in the proper direction by the receiving station. For example, four phototubes in 20° receivers can be mounted in a unit to scan 240° of the horizon, each receiver to scan 60° in ten seconds, or at the rate of one revolution per minute. Then any ten second signal will always be picked up by the receiver for 3⅓ seconds, which is ample for identification. Two such receivers in continuous operation, one at each end or at each side of a ship, will provide 360° scanning with considerable overlapping by the two units to allow for moderate ship maneuvering.

Lamps embodying my invention have been found to operate satisfactorily with a steady direct current flowing continuously and then superimposing the modulation current. The phototube receiver with an alternating current amplifier will not detect the direct-current-generated radiations, but only those due to the modulation current. The purpose of the continuous direct current is to maintain the necessary ionization in the arc stream, so that modulated alternating current may be applied at will upon caesium at a sufficient vapor pressure to give a uniformly high output of radiations in the resonance lines of that element.

An alternative scheme of operation, which may be more efficient, is to operate the lamp with a carrier alternating current, of say, 10,000 cycles per second, generated as by an alternating current oscillator, and then superimpose an audio frequency current, at say 800 cycles per second, for signaling. With a carrier current of this high frequency, voice modulation may be employed using a receiver that cuts off all high frequencies, or those above about 5,000 cycles per second. If code signals only are desired, the carrier current can be of much lower frequency, say 3000 cycles per second, and the receiver designed with a suitable band pass filter to give clear reception for the 800 cycle key tone.

A caesium vapor lamp embodying my invention may, alternatively, be used for signaling purposes by operating it on alternating current, instead of direct current, using an electronic tube generator, to produce a frequency of say 3,000 to 5,000 cycles per second, to operate the lamp during the idle periods. When the lamp is keyed, the frequency is changed to that of audio oscillations of 400, 800 or any convenient number of cycles per second. This may be accomplished by suitable changes in connections in the oscillation generator. The low frequency code message is taken on a receiver tuned to a narrow band of audio frequencies in the desired range.

Corning Glass No. 705 is a soda-borosilicate glass with a small percentage of alumina. It is designated as a tungsten sealing glass and sold under the trade-mark "Pyrex," laboratory No. G-705-AJ. It has a softening point at 703° C., an annealing point of 496° C., a coefficient of expansion of $46 \times 10^{-7}$ between 0 and 300° C., and a density of 2.23. The $\log_{10}$ of its resistivity at 350° C. is 6.77. Its power factor is .0033 (expressed as a decimal—not as percent), its dielectric constant 4.9, and its loss factor .0161 (expressed as a decimal—not as percent).

Although preferred embodiments of my invention have been disclosed, it will be understood that modifications within the spirit and scope of the invention may occur to persons skilled in the art.

I claim:

1. A vapor lamp comprising an envelope of glass resistant to caesium at temperatures between about 307° and 325° C., electrodes therein and between which a discharge occurs upon the application of electrical energy thereto, said envelope being generally cylindrical and of a diameter between 1 and 1½ inches and of a length between 4 and 6 inches, and an ionizable medium in said envelope consisting of argon at a pressure between 5 and 30 centimeters, admixed with between .2 and .5 gram of caesium.

2. A vapor lamp comprising an envelope, filamentary electrodes therein between which a discharge occurs upon the application of electrical energy thereto, leads to said electrodes, an extension from only one of the leads to each electrode, a toroidal stabilizing electrode connected to each extension encircling the corresponding one of said filamentary electrodes and connected thereto, and an ionizable medium in said envelope.

3. A vapor lamp comprising an inner envelope, an electrode therein at each end and comprising a filament oxide-coated, with its ends respectively connected to leads for a supply of heating current thereto, an extension from one of the leads of each electrode, a toroidal supplemental electrode connected to each extension, and surrounding the respective filamentary electrode for stabilizing the arc thereto, an ionizable medium in said envelope comprising argon at a pressure between 5 and 30 centimeters, admixed with a small proportion of metallic caesium, and an outer evacuated envelope for conserving the heat of operation.

4. A vapor lamp comprising an envelope, 1 to 1½" in diameter and 4 to 6" long, filamentary electrodes therein between which a discharge occurs upon the application of electrical energy thereto, leads to said electrodes, an extension from only one of the leads to each electrode, a toroidal stabilizing electrode connected to each extension encircling the corresponding one of said filamentary electrodes and connected thereto, and an ionizable medium consisting of argon at a pressure between 5 and 30 centimeters, admixed with .2 to .5 gram of caesium in said envelope.

5. In combination, a caesium vapor lamp, means operating said lamp to emit radiations of the average intensity desired, means modulating the operating current to cause a correspondingly modulated variation of said radiations, and means responsive solely to said radiations directly transmitted from said lamp to detect and indicate said modulated signal, said means comprising a photoelectric receiver of said modulated radiations.

6. In combination, a plurality of caesium vapor lamps each comprising an envelope, an electrode therein at each end, means connecting said plurality of lamps in series across a source of current for establishing arcs between the electrodes therein to generate infra-red radiations, an audio frequency modulator, a transformer, the primary winding of which is connected to said modulator and the secondary winding of which is connected to said lamps in series, in parallel with the supply of current, whereby modulating current is superimposed on the operating current to cause a corresponding modulation in the radiations emitted by said lamps, and means comprising a photoelectric receiver responsive solely to said radiations directly transmitted from said lamps to detect and indicate said modulated signal.

7. In combination, a plurality of caesium vapor lamps each comprising an envelope, an electrode therein at each end, means connecting said plurality of lamps in parallel across a source of direct current for establishing arcs between the electrodes therein to generate infra-red radiations, an audio frequency modulator, a transformer, the primary winding of which is connected to said modulator and the secondary winding of which is connected to said lamps in parallel, in parallel with the supply of direct current, in circuit with blocking condenser means, whereby modulating current is superimposed on the operating current to cause a corresponding modulation in the radiations emitted by said lamps, and means comprising a photoelectric receiver responsive solely to said radiations directly transmitted from said lamps to detect and indicate said modulated signal.

8. In combination, a caesium vapor lamp, means operating said lamp to emit a large proportion of infra-red radiations of the average intensity desired, means modulating the operating current to cause a correspondingly modulated variation in said radiations, means responsive solely to said radiations directly transmitted from said lamp to detect and indicate said modulated signal, said means comprising a caesium phototube in line with the generated radiations for receiving signals transmitted thereby, an amplifier connected to said phototube, and means connected to said amplifier for enabling an observer to apprehend the transmitted signals.

9. In combination, a caesium vapor lamp, means operating said lamp to emit a large proportion of infra-red radiations, means modulating the operating current to cause a correspondingly modulated variation in said radiations, a caesium phototube in line with the generated radiations for receiving the signals transmitted thereby, an amplifier connected to said phototube, means connected to the amplifier for enabling the observer to comprehend the transmitted signals, and a filter associated with the vapor lamp and one with the phototube for absorbing visible radiations, whereby said lamp filter may be used only at night to insure secrecy of the communications, and the phototube filter may be used only in the daytime to eliminate extraneous undesired radiations.

10. In combination, a caesium vapor lamp, high frequency power means operating said lamp to cause it to emit a large proportion of infra-red radiations, audio frequency means modulating the high frequency current to cause a correspondingly modulated variation in said radiations, and means responsive solely to said radiations directly transmitted from said lamp to detect and indicate said modulated signal, said means comprising a photoelectric receiver in line with said radiations.

11. A vapor lamp comprising an inner envelope, electrodes in said envelope between which a discharge occurs upon the application of electrical energy thereto, an ionizable medium in said envelope comprising an alkali metal and inert gas, an evacuated outer envelope for conserving the heat of operation, and means for holding said inner envelope in place with respect to said outer envelope comprising metal plate ring surrounding portions of an end of said inner envelope and having resilient projections extending outwardly from said plate ring to engage the inner surface of said outer envelope.

12. A vapor lamp comprising an inner envelope, electrodes in said envelope between which a discharge occurs upon the application of electrical energy thereto, an ionizable medium in said envelope comprising alkali metal and inert gas, an outer evacuated envelope for conserving the heat of operation, and means for holding said inner envelope in spaced relation with respect to said outer envelope comprising metal clamp means gripping lead-in portions of said envelope and having resilient fingers projecting outwardly therefrom to engage the inner surface of the outer envelope at each end of said inner envelope.

13. An electrode structure for a metal vapor discharge lamp comprising a main electrode, an auxiliary toroidal electrode surrounding said main electrode, the latter projecting toward the cooperating electrode beyond the plane of said toroidal electrode, leads for supporting said main and toroidal electrode, means connecting said leads to supply current therethrough to make said electrodes the combination anode in the device, and a resistor in the lead to the toroidal electrode to give a negative bias and focus the discharge.

14. A vapor lamp comprising a generally cylindrical envelope from 1 to 1½" in diameter and from 4 to 6" long, filamentary electrodes therein between which a discharge occurs upon the application of electrical energy thereto, leads to said electrodes, an extension from only one of the leads to each electrode, a toroidal stabilizing electrode connected to each extension encircling the corresponding one of said filamentary electrodes and connected thereto, each of said toroidal electrodes being formed as a ring of wire about .05" thick, with an outside diameter of about ½", and an ionizable medium in said envelope consisting of argon at a pressure of about 20 cm. of mercury admixed with about .2 gram of caesium.

15. A vapor lamp comprising an envelope, filamentary electrodes therein between which a discharge occurs upon the application of electrical energy thereto, leads to said electrodes, an extension from only one of the leads to each electrode, a ring of metal wire about .05" thick connected to each extension and having an outside diameter of about ½" encircling the corresponding one of said electrodes to form a toroidal stabilizing electrode therefor, and an ionizable medium in said envelope.

16. A vapor lamp comprising an inner envelope formed generally cylindrical and with rounded ends, a filamentary electrode therein adjacent each end and between which a discharge occurs upon the application of electrical energy thereto, each of said filamentary electrodes being provided with a pair of leads projecting through the adjacent end of the envelope for the introduction of heating current to said electrodes, an outer evacuated envelope, means mounting said inner envelope therein, comprising a ring at each end of the inner envelope and in which said end is seated, each ring having resilient tabs projecting outwardly to frictionally engage the inner surface of the outer envelope and a pair of apertured projections, leads to the filament at one end of said envelope passing through said apertured projections, disposed parallel to one another, and lying between the outer surface of said inner envelope and the inner surface of the outer envelope, and means insulating one of said leads from said rings.

17. A vapor lamp comprising an envelope formed of a borosilicate glass with a small percentage of alumina, designated as a tungsten sealing glass and sold as Corning Code No. 705 glass, with a softening point at 703° C., an annealing point of 496° C., a coefficient of expansion of $46 \times 10^{-7}$ between 0 and 300° C., and a density of 2.23, the $\log_{10}$ of its resistivity at 350° C. being 6.77, its power factor being .0033 (expressed as a decimal—not as per cent), its dielectric constant being 4.9, and its loss factor being .0161 (expressed as a decimal—not as per cent), the interior surface of which is coated with a film composed largely of boric acid and protective against alkali metal vapor, electrodes in said envelope between which a discharge occurs upon the application of electrical energy thereto, an inert gaseous filling admixed with caesium in said envelope, an outer envelope enclosing said inner envelope and evacuated to conserve the heat of operation, and means frictionally mounting said inner envelope in said outer envelope, and including means disposed between leads to one of said electrodes for spacing and insulating them from one another.

18. An electrode for a metallic vapor lamp comprising a toroidal member, an associated filamentary electrode, leads for mounting said electrode, an extension from only one of said leads, said toroidal member being connected to said extension, said electrode having a relatively sharp projection extending in a direction opposite to that of said lead means beyond the plane of said toroidal member, for keeping the generated arc stream on the approximate axis of an enclosing envelope.

19. An electrode structure for a metallic vapor lamp comprising a filamentary electrode, lead means mounting said electrode and serving to supply energizing current thereto, a hollow metal cylinder enclosing said filamentary electrode, a lead branching from one of said filamentary electrode leads to the adjacent edge of said cylinder and supporting the latter, and a pair of wires projecting diagonally from the other edge of said cylinder and secured together on the approximate axis thereof, in order to center the arc stream along the axis of the enclosing envelope.

20. An electrode structure for a metallic vapor lamp comprising a filamentary electrode, lead means mounting said electrode and serving to supply energizing current thereto, a hollow metal cylinder enclosing said filamentary electrode, and a lead branching from only one of said filamentary electrode leads to the adjacent edge of said cylinder and supporting the latter.

NORMAN C. BEESE.

REFERENCES CITED

The following references are of record in the file of this patent:

UNITED STATES PATENTS

| Number | Name | Date |
| --- | --- | --- |
| 1,824,452 | Wamser | Sept. 22, 1931 |
| 1,906,448 | De Boer et al. | May 2, 1933 |
| 1,985,044 | Lyle | Dec. 18, 1934 |
| 2,031,198 | Wright et al. | Feb. 18, 1936 |
| 2,032,588 | Miller, Jr. | Mar. 3, 1936 |
| 2,100,348 | Nicolson | Nov. 30, 1937 |
| 2,116,689 | Rompe | May 10, 1938 |
| 2,153,009 | Scott | Apr. 4, 1939 |
| 2,187,908 | McCreary | Jan. 23, 1940 |
| 2,213,245 | Germer | Sept. 3, 1940 |
| 2,228,327 | Spanner | Jan. 14, 1941 |
| 2,244,070 | Kurtz | June 3, 1941 |
| 2,249,672 | Spanner | July 15, 1941 |
| 2,351,254 | Elmendorf | June 13, 1944 |
| 2,429,118 | Besser | Oct. 14, 1947 |

FOREIGN PATENTS

| Number | Country | Date |
| --- | --- | --- |
| 468,805 | Great Britain | July 13, 1937 |
| 864,238 | France | Jan. 13, 1941 |

OTHER REFERENCES

Terman, Radio Engineers' Handbook, 1943, page 533.